United States Patent
Easter et al.

(10) Patent No.: US 10,352,468 B2
(45) Date of Patent: Jul. 16, 2019

(54) CONTROLLER APPARATUS, SYSTEM AND/OR METHOD FOR CONTROLLING PRESSURES IN A FLUID CONTROL SYSTEM

(71) Applicant: SMITH INTERNATIONAL, INC., Houston, TX (US)

(72) Inventors: Samuel Philip Easter, Katy, TX (US); Alan Wayne Burkhard, Florence, KY (US)

(73) Assignee: Smith International, Inc., Houston, TX (US)

( * ) Notice: Subject to any disclaimer, the term of this patent is extended or adjusted under 35 U.S.C. 154(b) by 75 days.

(21) Appl. No.: 15/035,154

(22) PCT Filed: Oct. 29, 2014

(86) PCT No.: PCT/US2014/062793
§ 371 (c)(1),
(2) Date: May 6, 2016

(87) PCT Pub. No.: WO2015/069504
PCT Pub. Date: May 14, 2015

(65) Prior Publication Data
US 2016/0290526 A1 Oct. 6, 2016

Related U.S. Application Data

(60) Provisional application No. 61/900,523, filed on Nov. 6, 2013.

(51) Int. Cl.
*E21B 21/08* (2006.01)
*E21B 21/10* (2006.01)
(Continued)

(52) U.S. Cl.
CPC ............ *F16K 31/047* (2013.01); *E21B 21/08* (2013.01); *E21B 21/10* (2013.01); *E21B 21/106* (2013.01); *E21B 41/00* (2013.01)

(58) Field of Classification Search
CPC ...... F16K 31/047; E21B 41/00; E21B 21/106; E21B 21/10; E21B 21/08
(Continued)

(56) References Cited

U.S. PATENT DOCUMENTS

| 677,940 | A | * | 7/1901 | Carr | ........................ | F16K 1/221 251/58 |
| 1,082,821 | A | * | 12/1913 | Richards | ............. | F04B 43/0736 251/58 |

(Continued)

FOREIGN PATENT DOCUMENTS

| RU | 2270391 C2 | 2/2006 |
| RU | 2374538 C1 | 11/2009 |
| RU | 2378546 C1 | 1/2010 |

OTHER PUBLICATIONS

PCT International Search Report and Written Opinion dated Feb. 12, 2015, by the Korean Intellectual Property Office (KIPO) in related International Application No. PCT/US2014/062793 (13 pages).

(Continued)

*Primary Examiner* — Eric Keasel
(74) *Attorney, Agent, or Firm* — Jeffrey D. Frantz (57) ABSTRACT

A fluid control system has a body with the inlet passage in fluid communication with a discharge passage. The position of a choke piston in the body controls flow of the fluid from the inlet passage to the discharge passage. A controller connected to the body has an actuator connected to a linkage that is connected to the choke piston. The controller posi-
(Continued)

tions the choke piston in the body using the actuator and the linkage to control the flow of a fluid from the inlet passage to the outlet passage.

8 Claims, 6 Drawing Sheets

(51) Int. Cl.
*E21B 41/00* (2006.01)
*F16K 31/04* (2006.01)

(58) Field of Classification Search
USPC .............. 251/279, 280, 58, 129.2, 289, 291
See application file for complete search history.

(56) References Cited

U.S. PATENT DOCUMENTS

| | | | | |
|---|---|---|---|---|
| 3,603,559 | A | * | 9/1971 | Totten .................. F16K 31/10 251/129.2 |
| 3,765,438 | A | * | 10/1973 | Di Sciascio ............ F15B 13/10 251/58 |
| 3,970,280 | A | * | 7/1976 | Kunz ..................... A23N 7/005 251/58 |
| 4,355,784 | A | | 10/1982 | Cain |
| 5,333,989 | A | * | 8/1994 | Missana ................. F01D 17/10 251/129.04 |
| 5,515,825 | A | | 5/1996 | Arai et al. |
| 6,253,787 | B1 | | 7/2001 | Suter et al. |
| 6,471,182 | B1 | | 10/2002 | McIntosh |
| 6,575,244 | B2 | | 6/2003 | Chang et al. |
| 6,883,614 | B2 | | 4/2005 | Schmidt et al. |
| 2006/0011877 | A1 | | 1/2006 | Suter et al. |
| 2008/0149182 | A1 | | 6/2008 | Burkhard et al. |

OTHER PUBLICATIONS

Communication Pursuant to Article 94(3) for the equivalent European patent application 14860182.6 dated Apr. 19, 2018.
International Preliminary Report on Patentability for the equivalent International patent application PCT/US2014/062793 dated May 19, 2016.
Office Action for the equivalent Russian patent application 2016122045 dated Jun. 6, 2017.
Extended Search Report for the equivalent European patent application 14860182.6 dated Aug. 2, 2017.
Decision to Grant for the equivalent Russian patent application 2016122045 dated Dec. 20, 2017.
Communication Pursuant to Article 94(3) EPC for the equivalent European patent application 14860182.6 dated Sep. 25, 2018.
Office Action for the equivalent Indonesian patent application P00201603057 dated Jan. 14, 2019.
Office Action for the equivalent Indian patent application 201647018784 dated Mar. 5, 2019.
Communication Pursuant to Article 94(3) for the equivalent European patent application 14860182.6 dated Mar. 29, 2019.

* cited by examiner

CONTROLLER APPARATUS, SYSTEM AND/OR METHOD FOR CONTROLLING PRESSURES IN A FLUID CONTROL SYSTEM

CROSS-REFERENCE TO RELATED APPLICATIONS

This application claims the benefit of U.S. Provisional Patent Application No. 61/900,523, filed Nov. 6, 2013, the disclosure of which is incorporated herein by reference.

BACKGROUND

The present disclosure relates generally to controlling the operating pressures within subterranean boreholes, and in particular, to a controller apparatus, system and/or method for controlling the operating pressures using a choke piston controller with a mechanical linkage in a fluid control system.

Many applications involve control of the back pressure of a fluid flowing in a system. For example, in the drilling of oil wells, a drill pipe is typically suspended in the wellbore with a bit on the lower end thereof. As the bit is rotated, a drilling fluid, such as a drilling mud, is circulated in a downward direction through the interior of the drill string and through the bit. The drilling fluid is circulated from the annulus of the wellbore to the surface. This fluid circulation is maintained for the purpose of removing cuttings from the wellbore, for cooling the bit, and for maintaining hydrostatic pressure in the wellbore to control formation gases and prevent blowouts, and the like. In those cases where the weight of the drilling mud is not sufficient to contain the bottom hole pressure in the well, application of additional back pressure on the drilling mud at the surface is conducted to compensate for the lack of hydrostatic head to keep the well under control. Thus, in some instances, a back pressure control device is mounted in the return flow line for the drilling fluid. Back pressure control devices are also used for controlling "kicks" in the system caused by the intrusion of salt water or formation gases into the drilling fluid which may lead to a blowout condition.

For example, U.S. Pat. Publ. 2008/0149182 A1, assigned to the assignee of the present application and incorporated herein by reference in its entirety, discloses a linear motor which drives a hydraulic system to control a choke to provide a pressure balancing force. A typical well for drilling for oil and/or gas is also disclosed. To control the operating pressures within the well within acceptable ranges, a choke is used to bleed pressurized fluidic materials from an annulus into a mud tank in a controlled manner to thereby create back pressure within the wellbore. The choke, in some well systems, is manually controlled by a human operator to maintain certain operating pressures within the well within acceptable ranges. The operator manually maintains the operating pressures within predetermined acceptable limits by manually adjusting the choke.

Moreover, maintenance of an optimum back pressure on the drilling fluid is complicated by variations in certain characteristics of the drilling fluid as the drilling fluid passes through the back pressure control device. For example, the density of the fluid is altered by the introduction of debris or formation gases, and/or the temperature and volume of the fluid entering the control device changes. Therefore, the desired back pressure is not achieved until appropriate changes have been made in the throttling of the drilling fluid in response to these changed conditions.

DETAILED DESCRIPTION

In one aspect, embodiments disclosed herein relate to the use of a controller system, apparatus and method to control operating pressures within a fluid control system. The controller may use an actuator to operate a mechanical linkage to control the position of a choke piston within the fluid control system.

Figure 1:
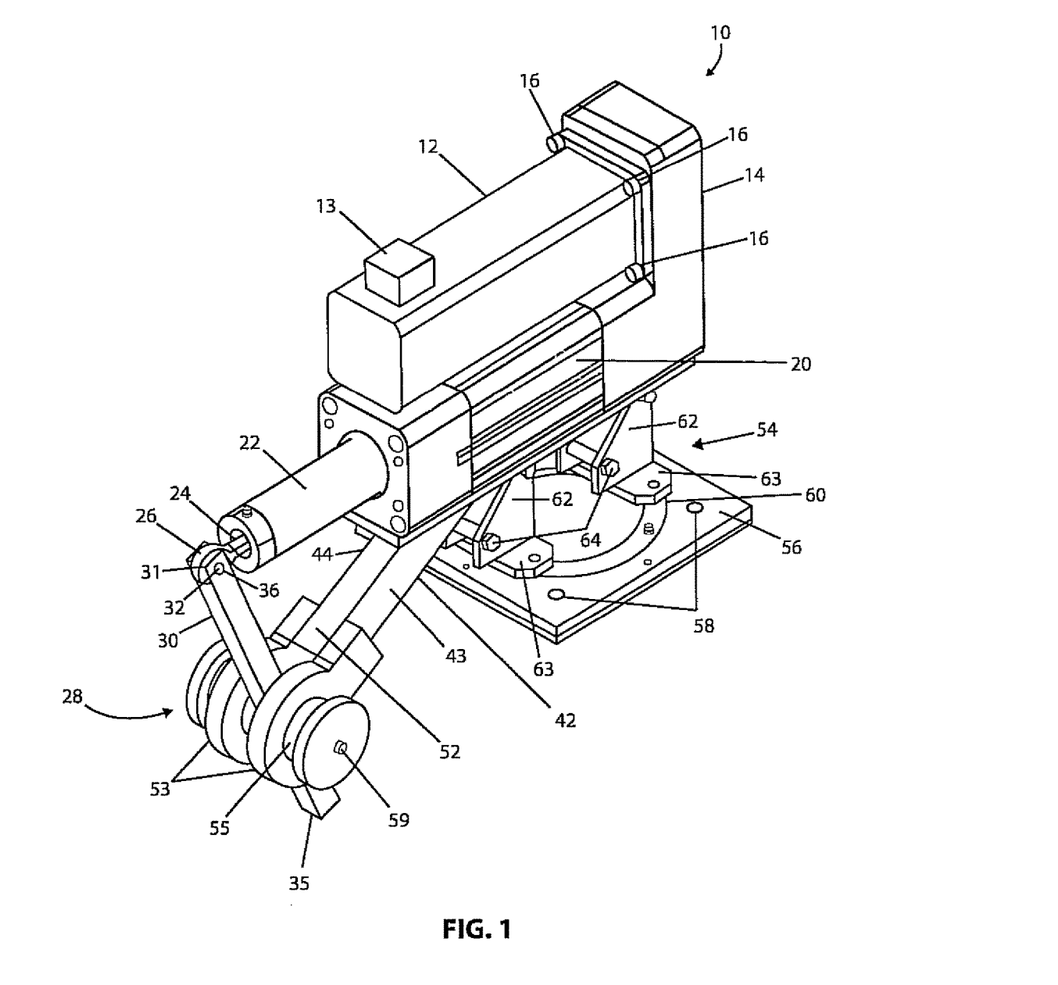
FIG. 1 is a perspective view of a choke system controller in accordance with the embodiments disclosed herein.

Referring now to FIG. 1, a controller 10 in accordance with the embodiments disclosed herein is illustrated. The controller 10 may be used to actuate and/or control a fluid control system 40 as illustrated in FIGS. 2-6. The controller 10 may have a servo motor 12 that may be electrically driven. Thus, the servo motor 12 may have a connector 13 for connecting cabling for electrical power and/or control of the servo motor 12.

The servo motor 12 may be connected to a gearbox 14 by fasteners 16, such as bolts, screws and/or the like, for example. The gearbox 14 may also be connected to an actuator 20. In an embodiment, the actuator 20 may be an electric rod screw actuator, for example. The actuator 20 may have a thrust tube 22 that may be driven by a ball screw (not shown) located inside the actuator 20. In an embodiment, the operation and/or construction of the ball screw may prevent the thrust tube 22 of the actuator 20 from being back driven.

The actuator 20 may have a rod end 24 extending from the thrust tube 22. In an embodiment, the rod end 24 may have a rod eye, an externally threaded rod end, a clevis rod end, an alignment coupler and/or the like. As shown in FIGS. 1-4, the rod end 24 may have a spherical rod eye 26 that may allow for slight misalignment between the load and the actuator 20. Such misalignment may be radial and/or angular. The spherical rod eye 26 may use a bearing (not shown).

Referring to FIGS. 1-4, a linkage 28 may connect the actuator 20 to a fluid control system 40. The linkage 28 may connect the spherical rod eye 26 on the rod end 24 of the actuator 20 to an actuating arm 30. The actuating arm 30 may have a first end 31 with a cut-out portion 32 at the first end 31. The cut-out portion 32 of the actuating arm 30 may form tabs 33 at the first end 31 of the actuating arm 30 on either side of the cut-out portion 32. A hole 34 may be located through the tabs 33. The cut-out portion 32 may be sized to accommodate and/or to receive the spherical rod eye 26 on the rod end 24 of the actuator 20 therein.

The actuating arm 30 may be connected to the spherical rod eye 26 on the rod end 24 of the actuator 20 by a first connector 36, such as a pin, a threaded pin, a bolt, a screw and/or the like. The first connector 36 may pass through the hole 34 in each of the tabs 33 that may be located at the first end 31 of the actuating arm 30. The first connector 36 may hold the first end 31 of the actuating arm 30 to the spherical rod eye 26 on the rod end 24 of the actuator 20.

The actuating arm 30 may have a second end 35 that may be connected by a second connector 37 to a connecting rod 41 of the fluid control system 40. The second connector 37 may be a pin, a threaded pin, a bolt, a screw and/or the like. The second connector 37 may pass through a hole 39 in the second end 35 of the actuating arm 30. The second connector 37 may extend through a hole 45 in the connecting rod 41. The second connector 37 may hold the second end 35 of the actuating arm 30 to the connecting rod 41 of the fluid control system 40.

The linkage 28 may have a pivot arm 42 that may have a first side 43 and a second side 44. The second side 44 may be located in a position opposite to the first side 43. The first side 43 and the second side 44 may define a width of the pivot arm 42. The pivot arm 42 may be connected to a plate 46 that may be connected to the actuator 20 and/or the gearbox 14.

Figure 4:
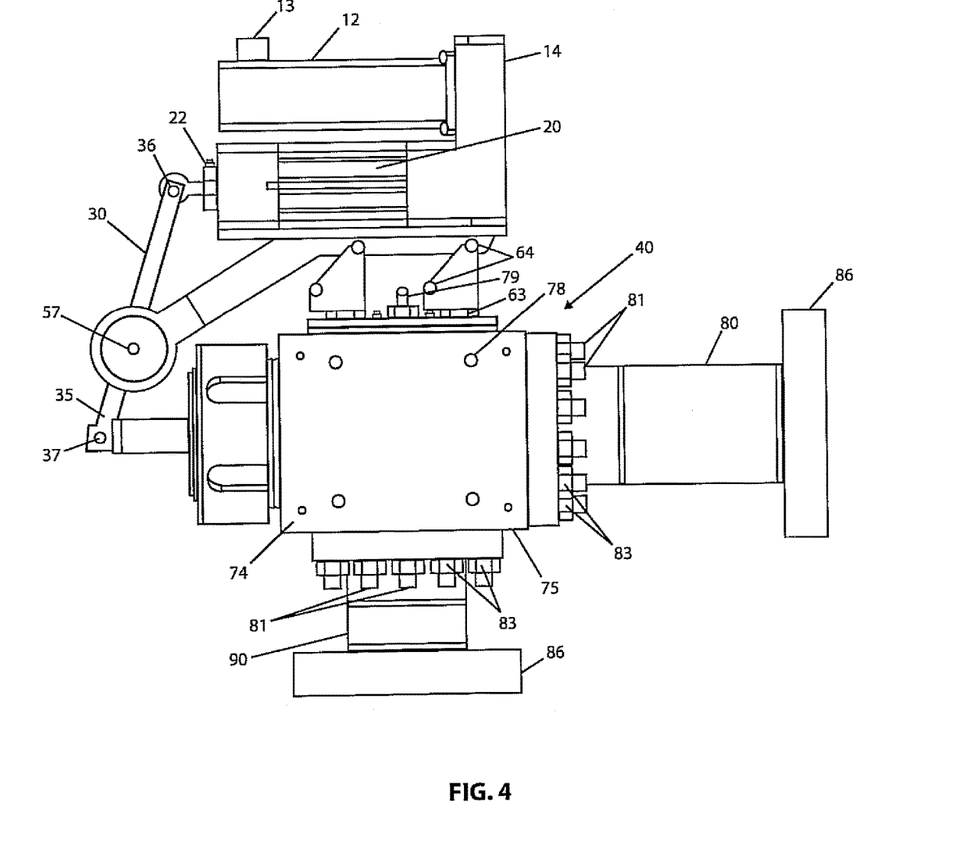
FIG. 4 is a side view of a choke system controller in a second position in accordance with the embodiments disclosed herein mounted to the fluid control system.

The pivot arm 42 may have a first portion 48 and a second portion 50. The first portion 48 of the pivot arm 42 may be connected to the plate 46. The second portion 50 may be positioned at an angle relative to the first portion 48. The second portion 50 may have an end 52. Yokes 53 may be connected to the end 52 of the second portion 50 of the pivot arm 42. The yokes 53 may be connected to the first side 43 and the second side 44 of the pivot arm 42. Shafts 55 may pass through the yokes 53. The shafts 55 may connect to the actuating arm 30 at a pivot point 57 that may be located on the actuating arm 30. The pivot point 57 may be coincident with an axis of the mounting point of the shafts 55 to the actuating arm 30 as shown in FIG. 4. The shafts 55 may have bearings (not shown) to facilitate rotation of the shafts 55 in the yokes 53. The shafts 55 may have a zerk 59 for inserting grease and/or other lubricants to lubricate and/or to facilitate rotation of the shafts 55 in the yokes 53.

The controller 10 may have a mounting platform 54 with a rotating plate 61. The rotating plate 61 may have a mounting plate 56 and a rotating portion 60. The mounting plate 56 may have mounting holes 58. The rotating portion 60 may be circular. The rotating portion 60 may rotate relative to the mounting plate 56 to permit rotation of the controller 10 relative to the fluid control system 40.

The mounting platform 54 may have mounting tabs 62 that may be connected to a flange 63. The mounting tabs 62 may be perpendicular to the flange 63. The flange 63 may connect to the rotating portion 60. The mounting tabs 62 may be separated by a distance substantially equal to the width of the pivot arm 42. The mounting tabs 62 may connect to the first portion 48 of the pivot arm 42. The mounting tabs 62 may connect to the first side 43 and/or the second side 44 of the first portion 48 of the pivot arm 42. The mounting tabs 62 may be connected to the pivot arm 42 with bolts 64, for example.

Figure 2:
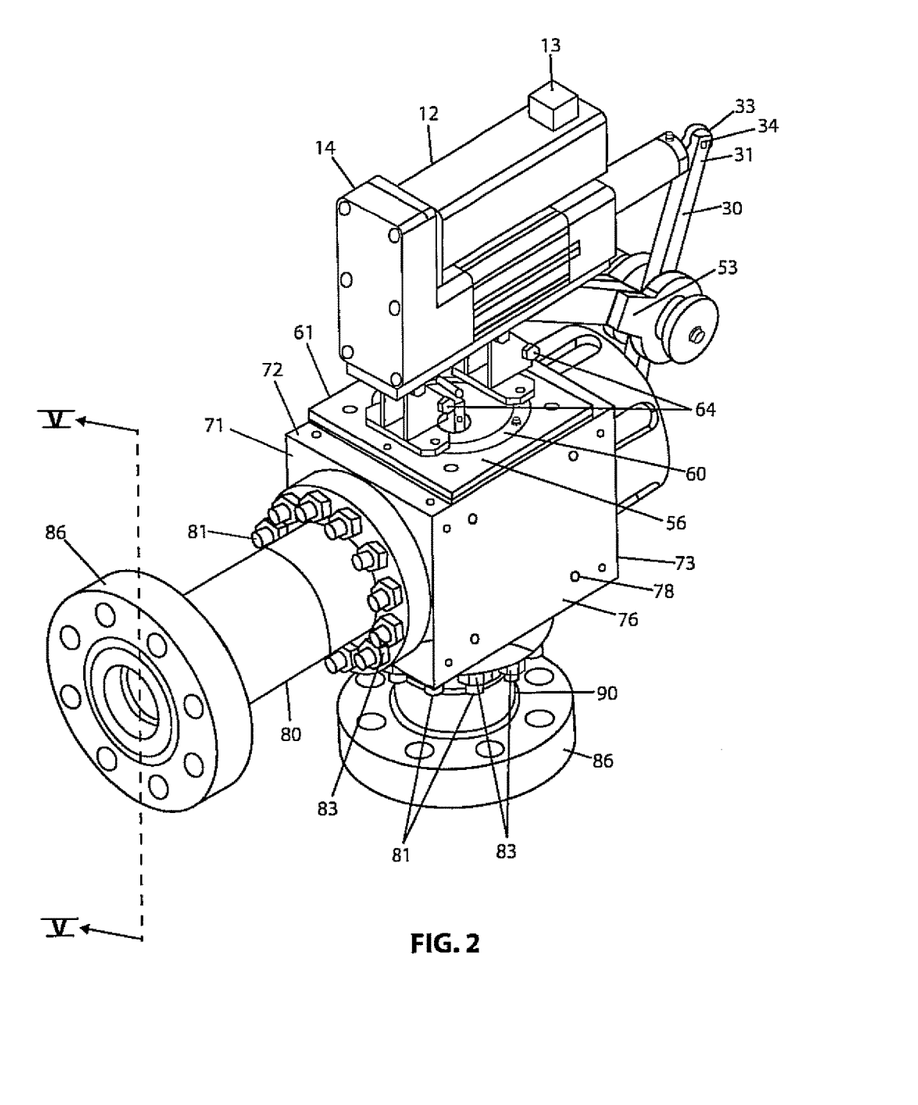
FIG. 2 is a perspective view of a choke system controller in accordance with the embodiments disclosed herein mounted to a fluid control system.
Figure 3:
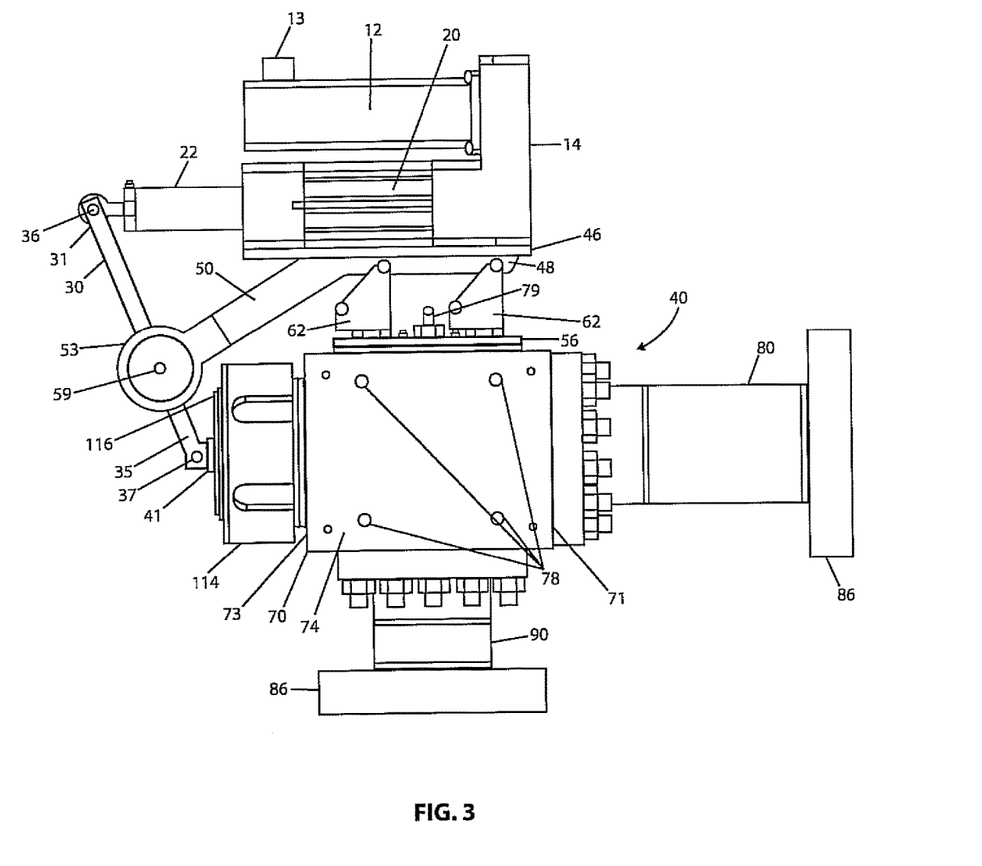
FIG. 3 is a side view of a choke system controller in a first position in accordance with the embodiments disclosed herein mounted to the fluid control system.

As shown in FIGS. 2-4, the controller 10 may be mounted to the fluid control system 40. In an embodiment, the fluid control system 40 may have a body 70 that may be generally cubic in shape. The body 70 may have a top surface 72, a first side surface 74 and/or a second side surface 76. The top surface 72, the first side surface 74 and/or the second side surface 76 may have mounting holes 78 that may align with the mounting holes 58 in the base plate 56 of the mounting platform 54 of the controller 10.

Thus, the controller 10 may be mounted to any one of the top surface 72, the first side surface 74 and/or the second side surface 76. The controller 10 may be mounted as desired depending on the installation. Although FIGS. 2-4 show the controller 10 mounted to the top surface 72 of the fluid control system 40; however, the fluid control system 40 may be installed and/or connected in a particular orientation in which the controller 10 may be mounted on the first side surface 74 and/or the second side surface 76. Thus, operator access and/or maintenance access to the controller 10 and/or the fluid control system 40 may be improved in such an arrangement.

In an embodiment, the fluid control system 40 may have a bleed valve 79 that may be located on the top surface 72 of the body 70 of the fluid control system 40. As illustrated, the mounting tabs 62 may elevate the controller 10 a distance above the fluid control system 40. Thus, the mounting tabs 62 may provide clearance to allow access to the bleed valve 79 when the controller 10 may be attached to the top surface 72 of the body 70 of the fluid control system 40.

Referring to FIGS. 3-6, the fluid control system 40 in accordance with embodiments disclosed herein is illustrated. The body 70 of the fluid control system 40 may have a first end 71 and a second end 73. The second end 73 may be located in a position opposite to the first end 71. The body 70 may also have a bottom surface 75 that may be located in a position opposite to the top surface 72 of the body 70. Thus, the bottom surface 75 may be perpendicular to the first end 71 and/or the second end 73 of the body 70.

Figure 5:
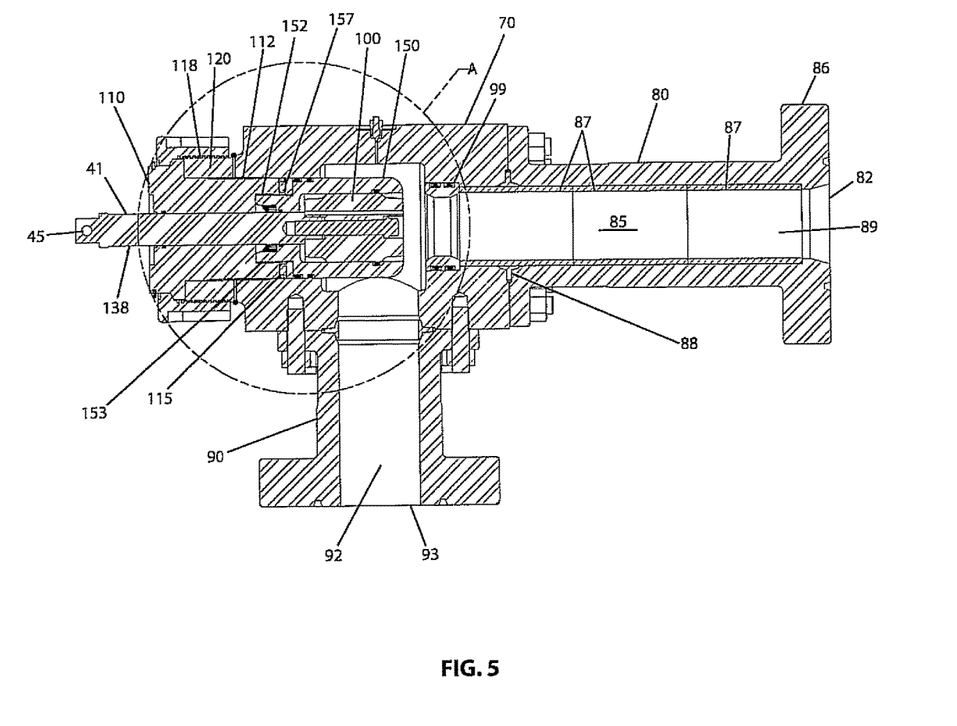
FIG. 5 is a cross-sectional view of the fluid control system taken along line V-V shown in FIG. 2.

An outlet spool 80 may be secured to the first end 71 of the body 70 by bolts 81 and nuts 83. The outlet spool 80 may be generally cylindrical in shape. The bolts 81 and the nuts 83 may be arranged to secure the cylindrical outlet spool 80 to the first end 71 of the body 70. The outlet spool 80 may have a discharge end 82. The fluid control system 40 may have an axial bore 85 that may extend from the discharge end 82 through the length of the outlet spool 80.

Wear sleeves 87 may be located in the axial bore 85 of the outlet spool 80. The wear sleeves 87 may be cylindrical liners. In an embodiment, the wear sleeves 87 may be carbide and may be located in the axial bore 85 that may be downstream of an intersection of the axial bore 85 with an inlet passage 92. The wear sleeves 87 may be held in the axial bore 85 of the outlet spool 80 by a sealing ring 88. The wear sleeves 87 may define a discharge passage 89 in the axial bore 85 of the body 70 extending from the intersection of the axial bore 85 and the inlet passage 92 to the discharge end 82 of the axial bore 85.

A choke seat 99 may be disposed in the body 70 and may be located within the axial bore 85 that may be upstream from the wear sleeves 87. In an embodiment, the choke seat 99 may be carbide. Seal rings 91 may extend in grooves 94 formed in the outer surface of the choke seat 99. The seal rings 91 may engage a corresponding portion of the inner surface of the body 70. The choke seat 99 may be held in the body 70 by the seal rings 91.

An inlet spool 90 may be secured to the bottom surface 75 of the body 70 by the bolts 81 and the nuts 83. The inlet spool 90 may be generally cylindrical in shape. The bolts 81 and the nuts 83 may be arranged to secure the cylindrical inlet spool 90 to the bottom surface 75 of the body 70. The inlet spool 90 may have an inlet passage 92 which may extend into the body 70 through an inlet end 93 of the inlet spool 90. The inlet passage 92 may intersect with the axial bore 85.

Connecting flanges 86 may be located at the discharge end 82 of the axial bore 85 and at the inlet end 93 of the inlet spool 90. The connecting flanges 86 of the discharge end 82 and the inlet end 93 of the inlet spool 90 may be respectively connected to appropriate flow lines. Drilling and/or formation fluid from a well may be introduced into the inlet spool 90, may pass through the body 70 and may typically discharge from the discharge end 82 of the axial bore 85 for recirculation.

A bonnet 110 may be secured to the second end 73 of the body 70 in a position opposite to the discharge end 82 of the axial bore 85. The bonnet 110 may have a cylindrical portion 112 that may extend into the axial bore 85 of the body 70. The bonnet 110 may be secured by a nut 114 and/or a retaining ring 116. The nut 114 may have internal threads 118 to engage external threads 120 formed in the body 70 at the second end 73 of the body 70.

The bonnet 110 may have an axial bore 122. The connecting rod 41 may be mounted in the axial bore 122 that may extend through the bonnet 110. The connecting rod 41 may slide in the axial bore 122 of the bonnet 110. In an embodiment, the connecting rod 41 may have a long stem 130 and/or a short stem 132. A seal ring 135 may extend in a groove 136 that may be formed in the inner surface of the bonnet 110 that may define the axial bore 122. The seal ring 135 may engage the outer surface of the long stem 130 of the connecting rod 41 as the connecting rod 41 may slide in the axial bore 122 of the bonnet 110.

The long stem 130 of the connecting rod 41 may have a first end portion 138 and a second end portion 139. The second end portion 139 may be located in a position opposite to the first end portion 138. The second end portion 139 may have a reduced diameter portion 140. The second end portion 139 may also have a central bore 141. The second end portion 139 of the connecting rod 41 may project inwardly into the axial bore 85. The first end portion 138 of the long stem 130 of the connecting rod 41 may project outwardly from the bonnet 110.

As illustrated in FIG. 5, the first end portion 138 of the long stem 130 of the connecting rod 41 may project outwardly from the bonnet 110 so that the hole 45 for connecting the linkage 28 may be accessible. Thus, the hole 45 may be positioned so that the second connector 37 may pass through the hole 39 in the second end 35 of the actuating arm 30 and may also pass through the hole 45 in the connecting rod 41. In this manner, the second connector 37 may be secured to hold the second end 35 of the actuating arm 30 to the connecting rod 41 of the fluid control system 40.

In an embodiment, the long stem 130 of the connecting rod 41 may be connected to the short stem 132. The short stem 132 may have external threads 134. The long stem 130 may have corresponding internal threads 136 that may be formed in the central bore 141 that may be located at the second end portion 139 of the long stem 130. The external threads 134 of the short stem 132 may be threaded into the internal threads 136 of the long stem 130 to form a threaded connection between the short stem 132 and the long stem 130.

A choke piston 100 may be mounted to the connecting rod 41. In an embodiment, the choke piston 100 may be carbide. The choke piston 100 may be generally cylindrical. The choke piston 100 may have a first end 101 and a second end 102. The second end 102 may be located in a position opposite to the first end 101. The first end 101 and/or the second end 102 may have a reduced diameter portion 103.

The choke piston 100 may have central bores 105 that may be located at the first end 101 and at the second end 102 of the choke piston 100.

Figure 6:
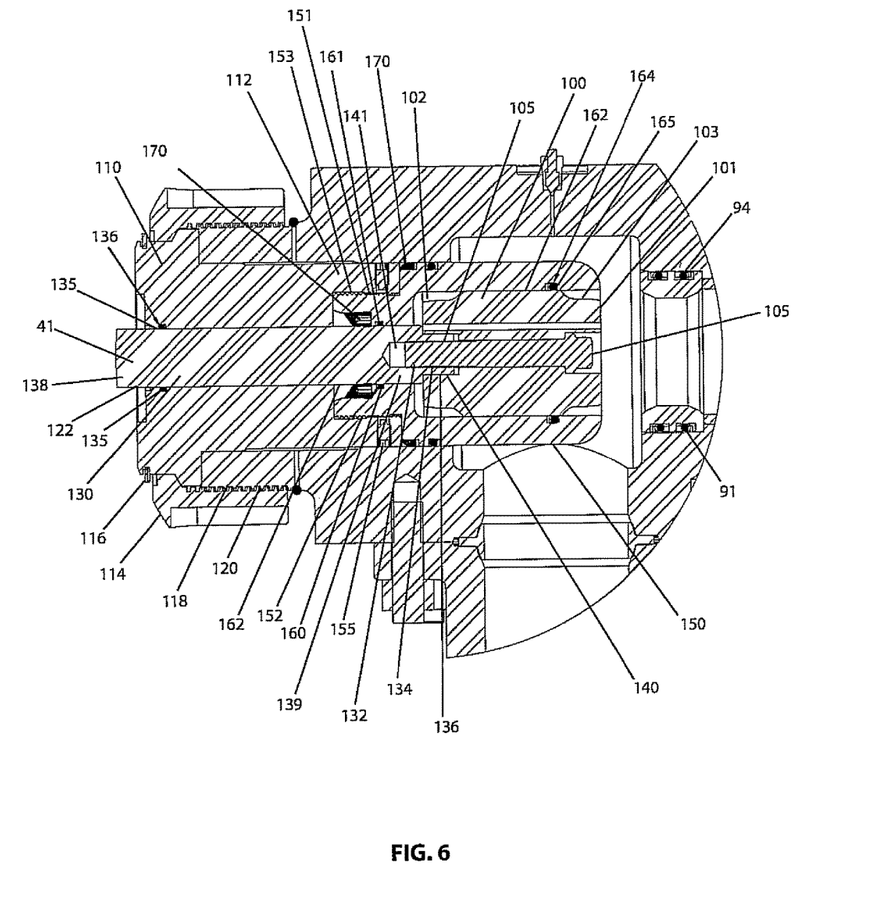
FIG. 6 is a cross-sectional view of the encircled portion "A" of the fluid control system shown in FIG. 5.

As illustrated in FIGS. 5 and 6, the central bore 105 that may be located at the first end 101 of the choke piston 100 may be sized and/or arranged to receive the reduced diameter portion 140 of the long stem 130 of the connecting rod 41 therein. The first end 101 of the choke piston 100 may abut the second end portion 139 of the long stem 130 of the connecting rod 41. The short stem 132 of the connecting rod 41 may be received within the center bore 105 at the second end 102 of the choke piston 100. The external threads 134 of the short stem 132 may be threaded into the internal threads 136 of the long stem 130 to form a threaded connection between the short stem 132 and the long stem 130. Thus, the choke piston 100 may be connected to the connecting rod 41.

The choke piston 100 may be disposed in the axial bore 85 with the first end 101 abutting the long stem 130 of the connecting rod 41. In operation, the choke piston 100 may extend into the intersection of the axial bore 85 with the inlet passage 92 to control the flow of fluid from the inlet passage 92 to the axial bore 85.

In an embodiment, the reduced diameter portion 103 at the first end 101 of the choke piston 100 may engage and/or mate with the choke seat 99 to control the flow of fluid from the inlet passage 92 to the axial bore 85. Thus, the choke piston 100 in combination with the choke seat 99 may form a seal to inhibit and/or prevent the flow of fluid from the inlet passage 92 to the axial bore 85.

A trim carrier 150 may be connected to the cylindrical portion 95 of the bonnet 110 extending into the axial bore 85 of the body 70. The trim carrier 150 may act as a stationary protector for the choke piston 100. The trim carrier 150 may have threads 151 that may be located in a reduced diameter portion 152. The threads 151 may engage threads 153 that may be formed in the cylindrical portion 95 of the bonnet 110. Set screws 155 may engage the reduced diameter portion 152 of the trim carrier 150. Thus, the trim carrier 150 may be secured to the cylindrical portion 95 of the bonnet 110. The trim carrier 150 may remain in a stationary position during operation of the fluid control system 40.

A seal ring 160 may extend in a groove 161 that may be formed in an axial bore 162 in the inner surface of the trim carrier 150. The seal ring 160 may engage the outer surface of the long stem 130 of the connecting rod 41 as the connecting rod 41 may slide in the axial bore 162 of the trim carrier 150. Similarly, a seal ring 164 may extend in a groove 165 formed in an inner surface of the trim carrier 150 and may engage a corresponding outer surface of the choke piston 100.

Further, the trim carrier 150 may have seals 170 that may be located in the reduced diameter portion 152 of the trim carrier 150. The seals 170 may engage an outer surface of the long stem 130 of the connecting rod 41. The seals 170 may also be located at the outer surface of the trim carrier 150 and may engage the axial bore 85 of the body 70. In an embodiment, the seals 170 may be spring energized seals.

In an embodiment, the position of the choke piston 100 within the fluid control system 40 may be controlled by coupling the controller 10 to the connecting rod 41. To this end, the controller 10 may be coupled to the choke piston 100 via the connecting rod 41. The controller 10 may control the position of the choke piston 100 to control pressures in a drilling operation, for example. As opposed to controlling the hydraulic pressure of a control fluid, the controller 10 may be coupled directly or indirectly to the connecting rod 41. The controller 10 may be used to control the force applied to the choke piston 100 to forego an intermediate hydraulic system. The controller 10 may use amperage control to directly generate a desired force.

In an embodiment, the servo 12 that may be acting through the gearbox 14 may cause the actuator 20 of the controller 10 to apply a force to move the choke piston 100 into a closed position. The force may be applied to the connecting rod 41 through the linkage 28. The controller 10 may vary the current to generate the desired force through the linkage 28.

In some embodiments, the controller 10 may incorporate a control system that may use proportional, integral, and/or derivative (PID) functions to control the set point to achieve control of the casing pressure in maintaining pressure near the user set point. PID control may be used to set the output based on the set point pressure and may also vary the output to maintain tighter set point control.

Referring now to FIGS. 3 and 4, the controller 10 may be indirectly coupled to the connecting rod 41 using the linkage 28. In the embodiment shown, the actuating arm 30 with the pivot point 57 may act as a lever. The pivot point 57 may be coincident with the mounting point of the shafts 55 to the actuating arm 30. The use of the linkage 28 may provide a mechanical advantage between the controller 10 and the connecting rod 41 by increasing the force that may be supplied by the controller 10 via the linkage 28.

In an embodiment, the method of operation of the controller 10 may place the choke piston 100 in any position between a fully closed position and a fully open position. FIG. 3 shows the choke piston 100 in the fully closed position in the fluid control system 40. FIGS. 4-6 show the choke piston 100 in the fully open position in the fluid control system 40.

Referring to FIG. 4, the fully open position of the choke piston 100 is illustrated. The thrust tube 22 of the controller 10 may be retracted in the fully open position of the choke piston 100. The thrust tube 22 may cause the actuating arm 30 to pivot about the pivot point 57 so that the first end 31 of the actuating arm may be moved in a direction toward the actuator 20. Thus, the second end 35 of the actuating arm 30 may be moved in a direction away from the bonnet 110 of the fluid control system 40.

As shown in detail with reference to FIGS. 5 and 6, the position of the choke piston 100 within the body 70 of the fluid control system 40 may be fully open when the linkage 28 may be oriented as shown in FIG. 3. In the fully open position shown in FIGS. 4-6, the drilling fluid, for example, may flow into the inlet end 93 of the inlet spool 90 and through the inlet passage 92. The drilling fluid may then pass by the trim carrier 150 and the fully open choke piston 100 flowing into the axial bore 85 and may discharge from the discharge end 82 of the axial bore 85 of the outlet spool 80 for recirculation.

Referring now to FIG. 3, the fully closed position of the choke piston 100 is illustrated. The thrust tube 22 of the controller 10 may be extended in the fully closed position of the choke piston 100. The thrust tube 22 may cause the actuating arm 30 to pivot about the pivot point 57 so that the first end 31 of the actuating arm 30 may be moved in a direction away from the end of the actuator 20. Thus, the second end 35 of the actuating arm 30 may be moved in a direction toward the bonnet 110 of the fluid control system 40.

As shown in FIG. 3, the connecting rod 41 may be fully inserted into the axial bore 122 of the bonnet 110 with the choke piston 100 in the fully closed position. As illustrated in FIGS. 5 and 6, the choke piston 100 may extend into the intersection of the axial bore 85 with the inlet passage 92 to control the flow of fluid from the inlet passage 92 to the axial bore 85.

In an embodiment, the reduced diameter portion 103 of the first end 101 of the choke piston 100 may engage and/or mate with the choke seat 99 to control the flow of fluid from the inlet passage 92 to the axial bore 85. Thus, the choke piston 100 in combination with the choke seat 99 may form a seal to inhibit and/or prevent the flow of fluid from the inlet passage 92 to the axial bore 85.

The fluid control system 40 may have the body 70 with the inlet passage 92 in fluid communication with the discharge passage 89. The position of the choke piston 100 in the body 70 may control flow of the fluid from the inlet passage 92 to the discharge passage 89. The controller 10 may be connected to the body 70. The controller 10 may have the actuator 20 connected to the linkage 28. The linkage 28 may be connected to the choke piston 100. The controller 10 may be configured to position the choke piston 100 in the body 70 using the actuator 20 and the linkage 28.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

The invention claimed is:

1. A fluid control system comprising:
   a body having an inlet passage and a discharge passage having an axial bore;
   a choke piston in the body, wherein the choke piston moves in the body to control a flow of a fluid from the inlet passage to the discharge passage;
   a controller connected to the body and mounted to a top side of the body, wherein the controller has an actuator; and
   a linkage connecting the actuator to the choke piston, wherein the controller is configured to position the choke piston in the body using the actuator and the linkage comprises
   a pivot arm, having a pivot point, connected to the controller such that the pivot point is provided along a length of the linkage between a first end of the linkage that is connected to the actuator and a second end of the linkage that is connected to the choke piston, wherein the linkage is pivotable or rotatable about the pivot point of the pivot arm so as to move the choke piston in the body, and further wherein the pivot arm of the linkage comprises a first portion connecting the body and the controller and a second portion that is provided between the first portion of the pivot arm and the pivot point of the pivot arm and positioned at an angle relative to the first portion of the pivot arm.

2. The fluid control system of claim 1 wherein the controller regulates a force applied to the choke piston.

3. The fluid control system of claim 1 further comprising:
   a rod coupling the linkage to the choke piston wherein the rod moves the choke piston in the body.

4. The fluid control system of claim 1 wherein the controller has a motor driving the actuator.

5. The fluid control system of claim 1 further comprising:
   a choke seat in the axial bore wherein the choke piston mates with the choke seat to form a seal.

6. The fluid control system of claim 1 further comprising:
   a rod connecting the actuator to the linkage.

7. A fluid control system comprising:
a body having an inlet passage and a discharge passage having an axial bore;
a choke piston in the body, wherein the choke piston moves in the body to control a flow of a fluid from the inlet passage to the discharge passage;
a controller connected to the body and mounted to a top side of the body, wherein the controller has an actuator;
a linkage connecting the actuator to the choke piston, wherein the controller is configured to position the choke piston in the body using the actuator and the linkage comprises
a pivot arm, having a pivot point, connected to the controller such that the linkage is pivotable or rotatable about the pivot point of the pivot arm; and
a rotating plate connected between the controller and the top side of the body such that an end of the pivot arm is located above the rotating plate and the top side of the body and is provided between the rotating plate and a bottom side of the controller,
wherein the pivot arm of the linkage comprises a first portion provided between the top side of the body and the controller and a second portion that is provided between the first portion of the pivot arm and the pivot point of the pivot arm and positioned at an angle relative to the first portion of the pivot arm.

8. A fluid control system comprising:
a body having an inlet passage and a discharge passage having an axial bore;
a choke piston in the body, wherein the choke piston moves in the body to control a flow of a fluid from the inlet passage to the discharge passage;
a controller connected to the body and mounted to a top side of the body, wherein the controller has an actuator;
a linkage connecting the actuator to the choke piston, wherein the controller is configured to position the choke piston in the body using the actuator and the linkage comprises
a pivot arm, having a pivot point, connected to the controller such that the linkage is pivotable or rotatable about the pivot point of the pivot arm; and
a thrust tube in the actuator connected to an end of the linkage and movable from a first position to a second position by the actuator such that moving the thrust tube between the first and second positions pivots the linkage about the pivot point of the pivot arm,
wherein the pivot arm of the linkage comprises a first portion connecting the body and the controller and a second portion that is provided between the first portion of the pivot arm and the pivot point of the pivot arm and positioned at an angle relative to the first portion of the pivot arm.

* * * * *